C. H. SHARP.
APPARATUS FOR MEASURING THE MAXIMUM VALUES OF ALTERNATING CURRENT VOLTAGES.
APPLICATION FILED OCT. 26, 1914.
1,209,766. Patented Dec. 26, 1916.
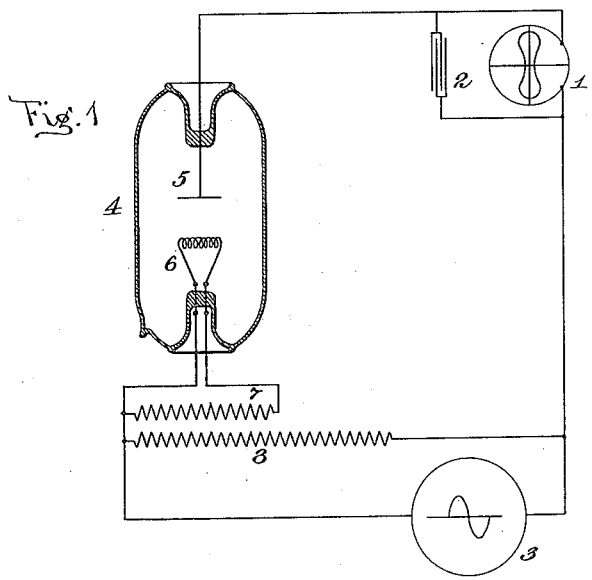
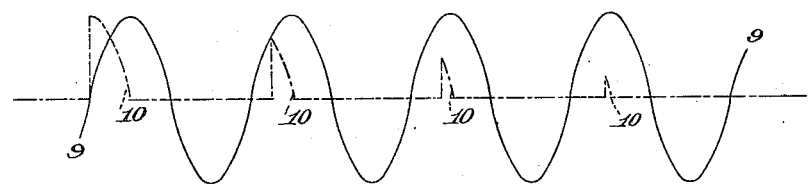
Witnesses:
Inventor
Clayton H. Sharp
By Dyn & Taylor
Attorneys.

UNITED STATES PATENT OFFICE.

CLAYTON H. SHARP, OF WHITE PLAINS, NEW YORK.

APPARATUS FOR MEASURING THE MAXIMUM VALUES OF ALTERNATING-CURRENT VOLTAGES.

1,209,766.   Specification of Letters Patent.   Patented Dec. 26, 1916.

Application filed October 26, 1914. Serial No. 868,679.

*To all whom it may concern:*

Be it known that I, CLAYTON H. SHARP, a citizen of the United States, residing in White Plains, county of Westchester, and State of New York, have invented a certain new and useful Apparatus for Measuring the Maximum Values of Alternating-Current Voltages, of which the following is a specification.

The object of this invention is to furnish an apparatus for measuring directly the maximum or peak or crest value of alternating voltages. The ordinary alternating voltmeter gives the effective or root-mean-square value of alternating voltages. For certain purposes it is desirable to know the maximum or peak or crest value of the alternating voltage wave, notably in testing insulating materials for dielectric strength or puncture value, where it is probably the maximum value which causes the break-down, and where the ratio of the maximum or peak or crest value to the root-mean-square value as indicated by the ordinary voltmeter depends on the wave form, a quantity which is often subject to variation arising out of the conditions of the test itself. One means of measuring peak voltage values has been pointed out by Sharp and Farmer who have also given a method whereby they may be measured. See *Transactions American Institute of Electrical Engineers*, June 28, 1912, pages 1237 to 1242.

In the drawings, Figure 1 shows a diagram of one of the arrangements whereby the invention is carried out; and Fig. 2 shows the voltage and current waves in the apparatus.

In both of the views, like parts are designated by the same reference characters.

In Fig. 1: 1 is an electrometer or electrostatic voltmeter. 2 is a condenser in parallel with the same. 3 is the source of alternating voltage to be measured. 4 is a glass bulb of a hot cathode valve or rectifier. 5 is the anode. 6 is the hot cathode. 7 is the secondary winding of a step-down transformer supplying current to heat the cathode. 8 is the primary winding of said transformer. The various connecting and leading-in wires are as shown.

In Fig. 2: 9 is the alternating voltage wave. 10 is the current wave passing into the condenser and voltmeter. The valve-condenser and step-down transformer may be inclosed in the voltmeter case, if so desired.

In the present invention advantage is taken of the known property of a suitable electric valve or rectifier to charge a condenser to the peak value of an alternating wave. An electric valve is an apparatus allowing current to pass principally in one direction. Electric valves have been constructed and described which will permit current to flow freely in one direction and will absolutely prohibit its passage in the opposite direction except with very high voltages. Such an apparatus is shown in Fig. 1. If a valve of this sort is placed in series with an electrostatic voltmeter connected across an alternating line, the relations of voltage and current will be such as are shown in Fig. 2. During the first quarter cycle of voltage 9, current 10 will flow into the voltmeter. This current will cease as soon as the voltage has attained its maximum or peak value and the charge remains on the voltmeter because of the inability of the current to flow in the opposite direction through the valve. If the flow of current through the valve during the first quarter cycle has not been sufficient to raise the potential of the voltmeter to the full peak voltage of the wave a certain amount of current will flow into the voltmeter during the fifth quarter cycle of the voltage wave and similarly a smaller amount may flow during the ninth, thirteenth, etc., quarter cycles until the potential of the voltmeter has become the same as that of the peak of the voltage wave. Thereafter no current will flow except such as may be necessary to supply the leakage from the voltmeter and connected apparatus shown. This, with a well constructed apparatus, may be made very small.

It is found that it is desirable to place a condenser having a considerably larger electrostatic capacity than that of the ordinary apparatus in parallel with the voltmeter in order to serve as a storage reservoir of charge and to prevent any undue loss in the voltmeter potential due to leakage in the interval between two successive peaks during which a charging current may flow. Both the condenser and voltmeter then become charged to the maximum voltage of the wave and the voltmeter will read this value in volts. If, when this condition has been obtained, the voltage on the line is for any reason reduced as for example, by the puncture of insulating material under test, the voltmeter needle will retain its maximum position dropping back toward zero slowly at a rate which depends upon the capacity and upon the leakage. Therefore, in testing with this apparatus it is not necessary to watch the voltmeter minutely to determine the maximum voltage, but a record is retained for a sufficient interval of time by the voltmeter of the maximum which it has attained, and this may be read after the voltage on the line has decreased. This feature of the arrangement has a convenience which is somewhat comparable to that of the self-registering clinical thermometers and is important in high voltage testing. If the valve is short circuited the voltmeter at once drops back to indicate the root-mean-square value of the alternating wave. Thus the apparatus becomes useful in determining the crest factor of alternating waves which is the ratio of the peak or crest voltage to the root-mean-square voltage. This is a simple means of determining whether an unknown wave is peaked or flat-topped in form.

While I have illustrated my invention in connection with an electrostatic voltmeter, I desire to have it understood that I do not wish to limit myself to such a construction as various other measuring devices may be employed. An electrostatic voltmeter combines in itself a condenser and a voltage measuring device. A practical equivalent for many purposes is an ordinary condenser with an electromagnetic measuring device having a high electrical resistance.

Having described my invention, what I claim as new and desire to secure by Letters Patent, is:

1. The combination with an alternating line, of an electrostatic voltmeter connected across the same, and an electric valve in series with said voltmeter.

2. The combination with an alternating line, of an electrostatic voltmeter connected across the same, a condenser in parallel with the voltmeter, and an electric valve in series with said voltmeter.

3. An apparatus for measuring the maximum values of alternating current voltages, which includes an electric valve in series with an electrostatic measuring instrument.

4. An apparatus for measuring the maximum values of alternating current voltages, which includes an electric valve in series with a measuring instrument, and a condenser in parallel with the said measuring instrument.

5. In an apparatus for measuring the maximum values of alternating current voltages, the combination with a condenser, and an indicating device responsive to an electrical charge, of means for charging the condenser and indicating device to the full peak voltage of the wave with current flowing in one direction, and means for preventing flow of current in the opposite direction.

6. An apparatus for measuring the maximum values of alternating current voltages, which comprises an electrostatic voltmeter connected across the line, and a rectifying device in series with said voltmeter, said device including an anode and a cathode, and means for heating the latter.

7. An apparatus for measuring the maximum values of alternating current voltages, which comprises an electrostatic voltmeter connected across the line, and a rectifying device in series with said voltmeter, said device including an anode and a cathode, means for heating the latter, and a condenser in parallel with said voltmeter.

This specification signed and witnessed this nineteenth day of September, 1914.

CLAYTON H. SHARP.

Witnesses:
J. H. KINTAND,
GEORGE KÜHNER.